United States Patent [19]

Swiss et al.

[11] 4,153,491

[45] May 8, 1979

[54] ACCELERATED SINTERING FOR A GREEN CERAMIC SHEET

[75] Inventors: William R. Swiss, Bloomfield, N.J.; Wayne S. Young, Poughkeepsie, N.Y.

[73] Assignee: International Business Machines Corporation, Armonk, N.Y.

[21] Appl. No.: 768,521

[22] Filed: Feb. 14, 1977

Related U.S. Application Data

[62] Division of Ser. No. 319,113, Dec. 29, 1972, Pat. No. 4,039,338.

[51] Int. Cl.² ............................................. C04B 35/64
[52] U.S. Cl. ....................................... 156/89; 264/61; 264/62; 264/63; 264/66
[58] Field of Search ..................... 264/61, 63, 66, 56, 264/62; 156/89

[56] References Cited

U.S. PATENT DOCUMENTS

| | | | |
|---|---|---|---|
| 3,517,093 | 6/1970 | Wentzel | 264/61 |
| 3,538,202 | 11/1970 | Bidard | 264/63 |
| 3,698,923 | 10/1972 | Stetson | 264/61 |
| 3,792,139 | 2/1974 | Weinstein | 264/61 |
| 3,917,778 | 11/1975 | Shiroki et al. | 264/63 |
| 3,948,706 | 4/1976 | Schmeckenbecher | 264/61 |
| 3,988,405 | 10/1976 | Smith et al. | 264/63 |

*Primary Examiner*—Robert F. White
*Assistant Examiner*—John A. Parrish
*Attorney, Agent, or Firm*—Henry Powers

[57] ABSTRACT

A green ceramic sheet material adaptable for accelerated sintering comprising a high alumina ceramic green sheet having an average particle size greater than one micron with a close particle size distribution and being formed into a solid integrated circuit interconnection substrate by heating the ceramic green sheet directly to its sintering temperature, absent the binder burn-off step.

5 Claims, 8 Drawing Figures

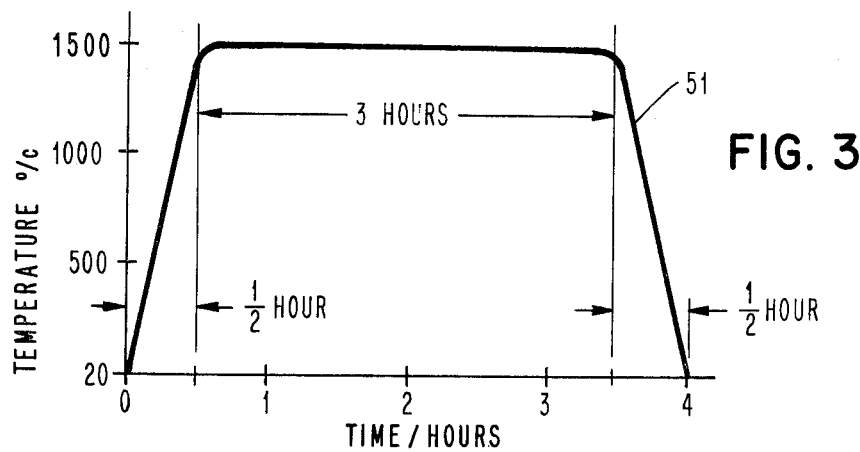
FIG. 3
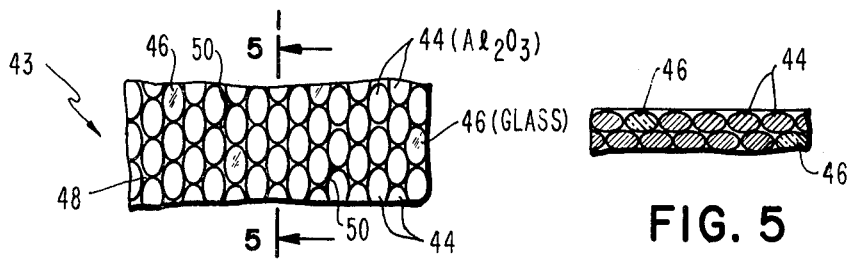
FIG. 4
FIG. 5
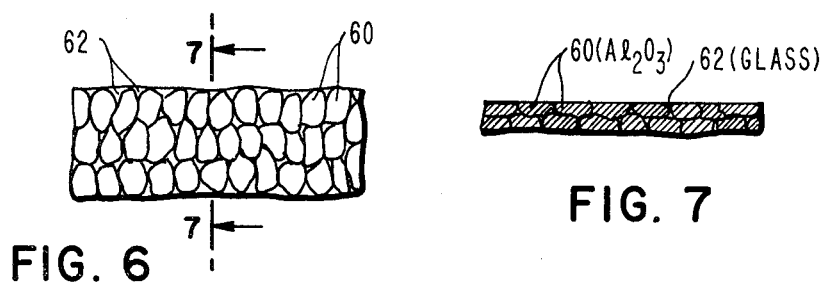
FIG. 6
FIG. 7
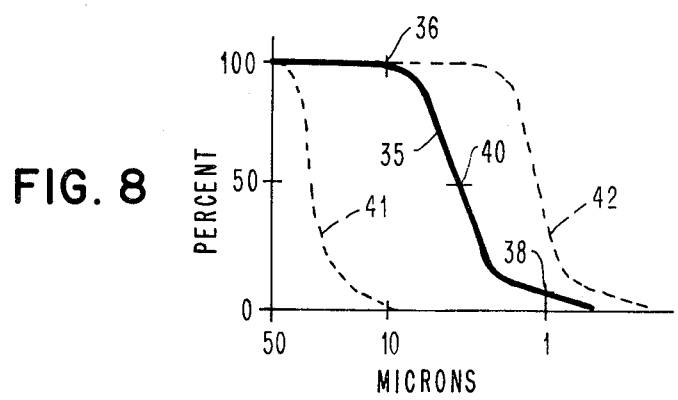
FIG. 8

ACCELERATED SINTERING FOR A GREEN CERAMIC SHEET

This is a division of application Ser. No. 319,113 filed Dec. 29, 1972 now U.S. Pat. No. 4,039,338.

DESCRIPTION OF THE PRIOR ART

In many electronic packaging areas, flexible ceramic green sheet material is employed to form multi-layer ceramic modules. Individual ceramic green sheets are metallized, stacked, laminated and fired to form a monolithic ceramic-metal package. This approach provides three dimensional wiring capabilities so as to allow the formation of high density electronic packages having excellent performance and reliability characteristics.

In the prior art, the ceramic green sheet material is formed basically by combining a ceramic particulate powder, such as alumina, with suitable plasticizers, solvents and binders so as to form a slip. The slip is then cast into thin layers and dried to form the ceramic green sheet material. Greater details of this prior art approach is set forth in the article entitled "A Fabrication Technique for Multi-layer Ceramic Modules", H. D. Kaiser et al, Solid State Technology, May 1972, pages 35–40.

The prior art heating cycle for sintering ceramic green sheet material is illustrated in FIG. 1. The cycle is constituted by three primary phases. The organic binder or carbon occupying the interstices is driven from the ceramic green sheet during the binder burn off phase. Next, the ceramic particles are sintered at the elevated sintering temperature. Finally, a controlled cool down cycle is employed to prevent thermal shock of the fired solid substrate. In this prior art process, it is critical that the binder burn-off be accomplished at a very slow and controlled rate in order to prevent rupture and explosion due to the oxidation of the binder material and the outward diffusion and release of gases. This slow controlled binder burn off is critical in order to maintain the mechanical and electrical integrity of the fired electronic package. The criticality of the binder burn-off step arises by virtue of the interstitial make up of the ceramic green sheet material.

In the prior art, the ceramic green sheet material basically comprises a high alumina ceramic particulate and glassy frit composition which define a plurality of interstices whose volumes are occupied by the organic binder of the system. In all prior art methods, the binder burn-off is an extremely critical and important step in the firing process. A too rapid heat up causes binder burn-off to occur at a nearly explosive rate. Thus, a slow controlled heating phase during the firing cycle is necessary to insure a high quality fired ceramic substrate having the desired physical and electrical characteristics.

A representative firing cycle for high alumina electrical interconnection packages as depicted in FIG. 1 illustrates a very gradual binder burnoff phase of approximately 6 hours. During this portion of the process, the temperature is gradually raised to the final sintering temperature in the range of 1500° C. over a time period of approximately 6 hours. The alumina particles are then maintained at this elevated temperature for a period of approximately 3 to 7 hours in order to sinter the alumina particles. Thereafter, a slow controlled cooled slow down step is necessary in order to prevent thermal shock.

SUMMARY OF THE INVENTION

It is therefore an object of the present invention to provide a flexible ceramic dried green sheet material which can be sintered without a critical binder burn-off step to produce high alumina electrical interconnection substrates.

In accordance with the aforementioned object, the present invention provides a flexible ceramic dried green sheet dispersion comprising high alumina particles having an average particle size greater than one micron with attendant close particle size distribution which can be sintered by heating it directly to its sintering temperature without a controlled slow binder burn-off step.

BRIEF DESCRIPTION OF THE DRAWING

FIG. 3 depicts a firing cycle for the present invention and illustrates that the binder burn out step is substantially eliminated.

FIGS. 4, 5 and 6, 7 are greatly exploded plan and cross-sectional views of a ceramic green sheet material schematically illustrating the composition make up before and after firing, respectively.

FIG. 8 is a curve illustrating the particle size distribution necessary for forming the ceramic green sheet of the present invention.

DESCRIPTION OF THE PREFERRED EMBODIMENT

Figure 1:
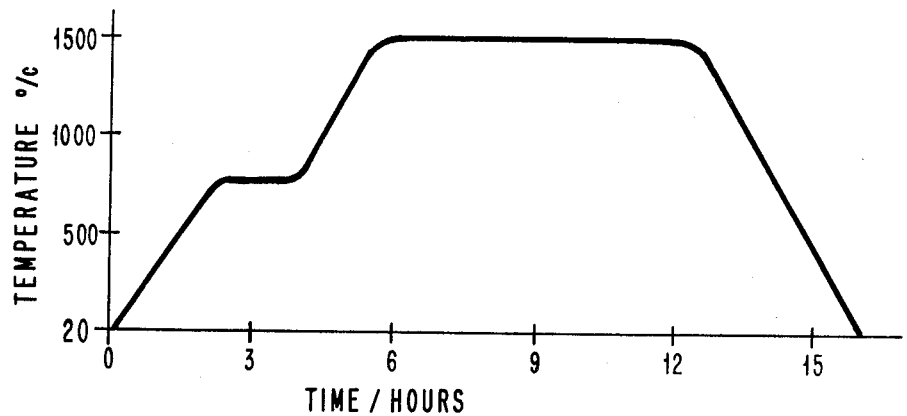
FIG. 1 is a curve illustrating a prior art firing cycle comprising a critical binder burn-off heating cycle, a sintering cycle, and a controlled cool down cycle.
Figure 2:
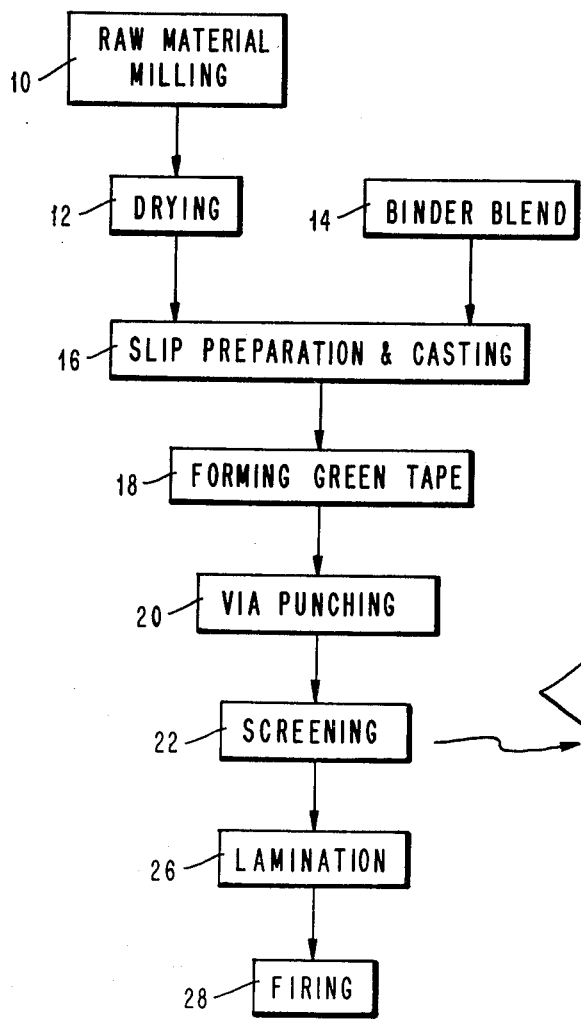
FIG. 2 is a process block diagram illustrating the basic steps for forming the flexible ceramic green sheet material of the present invention.
Figure 2:
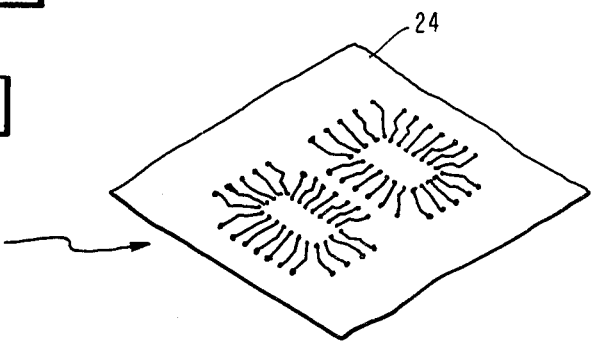

Now referring to FIG. 2, it illustrates the general process steps for forming the ceramic green sheet material of the present invention. Initially, the particle sizes of a high alumina powder and the glassy frit are adjusted at 10 in a raw milling step by conventional means such as ball or vibrator milling. These constituents are then dried at step 12. Specific details of the raw material milling step as it pertains to particle size distribution are discussed in greater detail below, and only the general steps necessary to form the green sheet material are illustrated in FIG. 2. A suitable organic binder is formed at step 14. In actual practice, the binder also comprises an organic material, such as, polyvinyl butyral, a plasticizer such as dioctyl pthalate, and an organic volatile solvent, such as toluene-alcohol and cyclohexanone, as is well known in the art.

High alumina, $Al_2O_3$, ceramic powders are commercially available and essentially comprise 99.6% alumina $Al_2O_3$ and 0.04% $NA_2O$, by way of example. One suitable glassy frit composition for the preferred embodiment substantially consists of:

| Ceramitalc | 23.72 wt % |
| --- | --- |
| Kaolin-Ajax P | 62.77 |
| Cab-O-Sil | 2.66 |
| $CaCo_3$ | 10.83 |

The slip material is formed at 16 and then cast into thin sheets. Next it is dried for forming the finished ceramic green sheet illustrated at step 18. The dried ceramic green tape is punched at 20 to form the desired interconnection via hole patterns when the ceramic green tape is used to form a multi-layer ceramic interconnection package. Any desired metallized electrical interconnection pattern (single or multi-layer applications) is deposited on the ceramic green sheet layer, as for example by a screening at 22. A plurality of punched and screened sheets, one of which is structurally illustrated at 24, are then laminated and fired at steps 26 and 28, respectively, in order to form a metallized multilayer ceramic interconnection electrical package.

Now referring to FIGS. 3 through 8 for a more detailed description of the raw material milling step and the firing step generally described in the schematic process steps of FIG. 2 at 10 and 28, respectively. During raw material milling, it is necessary to form predetermined precisely sized alumina particles in order to allow subsequent firing directly to a sintering temperature without the controlled binder burn-off step. The solid curve 35 in FIG. 8 illustrates the necessary and critical particle size distribution. The curve between points 36 and 38 illustrate that approximately 95% of the particle sizes used to form the ceramic green sheet of the present material is between 1 and 10 microns. Further, it has been found that it is necessary that the average particle size of the high alumina starting material must be greater than 1 micron, and this limitation is represented by the mean point 40 on the solid distribution curve. From the solid distribution curve 35, it is apparent that 95% of the particle sizes fall with 1 or 2 microns of the average or mean value represented by point 40. Dotted distribution curve 41 and 42 illustrate particle size distributions on both ends of the spectrum which in actual practice are unsuitable for applicants' invention. The frit is milled with the alumina and because it is softer than the alumina, the milling process reduces the frit particle size distribution to essentially that of the alumina.

As seen in FIGS. 4 and 5, the green sheet material 43 is constituted by a plurality of alumina particles 44 and glassy frit particles 46 in a numerical weight ratio of approximately 10:1, and of comparable size since the frit and alumina are milled together. In combination they create a plurality of interstices whose volumes are defined primarily by the average particle size distribution of the alumina particles 44 and the glassy frit. Prior to firing, the plurality of interstices, shown generally at 48, are occupied by the organic binder material schematically shown at 50. By carefully controlling the particle size distribution, substantially represented by curve 35, the plurality of interstices 50 are of sufficient volume so as to enable rapid and accelerated binder removal as the green ceramic sheet is raised directly to its sintering temperature. A particle size distribution as illustrated by the dotted curve 42 of FIG. 8 results in minute particles of the alumina itself occupying the interstices formed by the larger particles. This condition causes the ceramic green sheet material to erupt or explode if raised directly to its sintering temperature. On the other hand, an excessively large particle size, as represented by the distribution curve 41, is undesirable and necessitates an extremely high sintering temperature substantially above the 1500° range to that associated with the present day state of the art high alumina substrates. Moreover, the extremely high sintering temperatures are detrimental to most metallurgical systems used in the formation of high alumina electrical interconnection substrates.

One representative firing cycle curve 5 for ceramic green sheets fabricated according to the present invention, with the binder burn out step substantially eliminated, is illustrated in FIG. 3. The temperature initially is raised from approximately 20° C. to 1500° C. in approximately 30 minutes. The ceramic green sheet is then held at its sintering temperature for approximately 3 hours, and thereafter cooled to ambient conditions in approximately one half hour. Significantly, ceramic green sheet material formed in accordance with the present invention preferred embodiment is readily and successfully fireable to its associated sintering temperature at initial rates of 50° C./minute. However, ceramic green sheets also have been successfully fired under initial heating cycles in the range of 400° C. per minute.

After firing, the ceramic green sheet material is sintered to produce a solid substrate as schematically illustrated in FIGS. 6 and 7. The fired substrate now comprises a plurality of sintered ceramic particles 60 and a homogeneous glassy frit material 62 occupying the interstices of the structure. The organic binder previously contained in the ceramic green sheet material, illustrated in FIGS. 4 and 5, is rapidly oxidized during the initial heating cycle when the ceramic green sheet material is being raised directly to its sintering temperature.

The fired alumina particles illustrated in FIGS. 6 and 7 are shown as being of slightly irregular shape compared to that illustrated in FIGS. 4 and 5, as a slight chemical reaction occurs between the glassy frit and the alumina particles during the sintering portion of the heating cycle, approximately 1500° for the specific compositions of materials illustrated in the preferred embodiment of the present invention.

Although the FIG. 3 embodiment illustrates an initial heating rate of 50° C. per minute as constituting a preferred rate, it is to be understood that success in firing ceramic green sheet materials has been achieved at initial rates of 400° C./minute up to a temperature of 1400° C. in dry and wet forming gas having a 25° C. dew point, without any delamination or cracking of parts.

Other ceramic green sheets, comprising a high alumina ceramic particulates and a glassy frit substantially as previously described in connection with the preferred embodiment of the present invention, have been successfully fired in a 25° C. dew point forming gas. The ceramic green sheet material is subjected to an initial heating rate of 50° C./minute going from 20° C. to 1530° C. in 30 minutes and then it is held at its sintering temperature of 1530° C. for approximately 1 hour. Thereafter, the structure is cooled from 1530° C. to 20° C. in 30 minutes. Successful results have been achieved with parts ranging from dimensions of 0.67 inches by 0.67 inches by 0.084 inches to 1.008 inches by 1.008 inches by 0.865 inches. For these particular samples, the resulting fired ceramic solid body possessed fired densities in the general range of 3.75 grams per cubic centimeter and shrinkage rates of any where between 13.2% to 15.5%. These dimensions are only illustrative, and the invention is equally applicable to larger parts as long as thermal shock is avoided.

While the invention has been particularly shown and described with reference to a preferred embodiment thereof, it will be understood by those skilled in the art that various changes in form and details may be made therein without departing from the spirit and scope of the invention.

What is claimed is:

1. A method of forming a solid integrated circuit interconnection dielectric substrate comprising the steps of:

(a) forming a flexible ceramic dried green sheet having a high content of ceramic particles, the said ceramic particles having a uniform distribution with an average particle size represented by point 40 on the graph of FIG. 8 with 95% of said particles falling within two microns of said point, and heating said green sheet directly to its sintering temperature for forming said solid dielectric substrate.

2. A method of forming a solid integrated circuit interconnection dielectric substrate as in claim 1 further including the step of:

(a) selecting alumina, for said ceramic particles.

3. A method of forming a solid integrated circuit interconnection dielectric substrate as in claim 2 wherein said forming step further includes the steps of:

adding binder and glassy frit materials for forming a flexible ceramic dried green sheet dispersion with said binder material occupying the interstices defined by said alumina particles and glassy frit material.

4. A method of forming a solid integrated circuit interconnection dielectric substrate as in claim 3 further including the step of:

(a) depositing a metallized pattern on said flexible ceramic dried green sheet.

5. A method of forming a solid integrated circuit interconnection dielectric substrate as in claim 4 further including the step of:

(a) laminating a plurality of said metallized green sheets prior to said heating step.

* * * * *